United States Patent [19]

Bryant et al.

[11] Patent Number: 5,682,097

[45] Date of Patent: Oct. 28, 1997

[54] ELECTROMAGNETIC ACTUATOR WITH MOVABLE COIL AND POSITION SENSOR FOR DRIVE COIL

[75] Inventors: Robert Cooper Bryant, Honeoye Falls; Michael Joseph O'Brien; J. Kelly Lee, both of Rochester, all of N.Y.

[73] Assignee: Eastman Kodak Company, Rochester, N.Y.

[21] Appl. No.: 594,222

[22] Filed: Jan. 31, 1996

[51] Int. Cl.$^6$ .................. G01B 7/14; G01B 7/30
[52] U.S. Cl. .................. 324/207.17; 324/207.16; 336/115
[58] Field of Search ............ 324/207.12, 207.15, 324/207.16, 207.17, 207.18, 235, 238, 260, 262; 310/12, 13, 14, 168, 155; 361/143, 152, 159; 340/686, 870.31, 870.32; 336/117, 118, 124, 125, 115

[56] References Cited

U.S. PATENT DOCUMENTS

| | | | |
|---|---|---|---|
| 3,479,582 | 11/1969 | Meyer | 324/207.16 |
| 3,502,966 | 3/1970 | Perets et al. | 324/207.15 |
| 3,513,408 | 5/1970 | McGee | 324/207.16 |
| 4,236,093 | 11/1980 | Birnbaum | 324/207.17 |
| 4,517,514 | 5/1985 | Howell | 324/207.15 |
| 4,950,986 | 8/1990 | Guerrero | 324/207.19 |
| 5,046,702 | 9/1991 | Miyazawa et al. | 324/207.16 |
| 5,107,211 | 4/1992 | Rose | 324/207.16 |
| 5,172,298 | 12/1992 | Shimizu et al. | 324/207.16 |
| 5,313,161 | 5/1994 | Miyazawa et al. | 324/207.22 |
| 5,329,416 | 7/1994 | Ushiyama et al. | 324/207.12 |
| 5,394,290 | 2/1995 | Ushiyama et al. | 324/207.17 |
| 5,469,052 | 11/1995 | Hulsing, II | 324/207.16 |

FOREIGN PATENT DOCUMENTS 0254803  11/1986  Japan ................. 324/207.17

OTHER PUBLICATIONS

R. H. Darling, High Reliability Position Sensor, IBM Tech Disclosure Bulletin, vol. 12, No. 4 Sep. 1969.

*Primary Examiner*—Sandra L. O'Shea
*Assistant Examiner*—Jay M. Patidar
*Attorney, Agent, or Firm*—Charles E. Snee, III; David A. Howley

[57] ABSTRACT

An electromagnetic actuator with position sensor includes a core made of a soft magnetic material, a permanent magnet located adjacent the core for providing a magnetic field in the core and an electrically conductive drive coil wrapped about a first portion of the core. The drive coil is supported such that the drive coil can move along the first portion of the core. An electrically conductive sense coil is wrapped about a second portion of the core and fixed relative to the core such that there is substantially no relative movement between the sense coil and the core. When an electrical current is passed through the drive coil, the drive coil moves along the first portion of the core and an electrical current is induced in the sense coil which indicates the position of the drive coil relative to the first portion of the core.

5 Claims, 4 Drawing Sheets

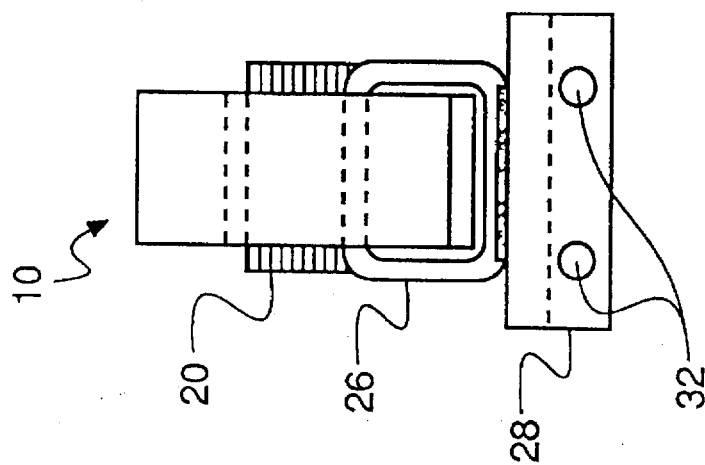
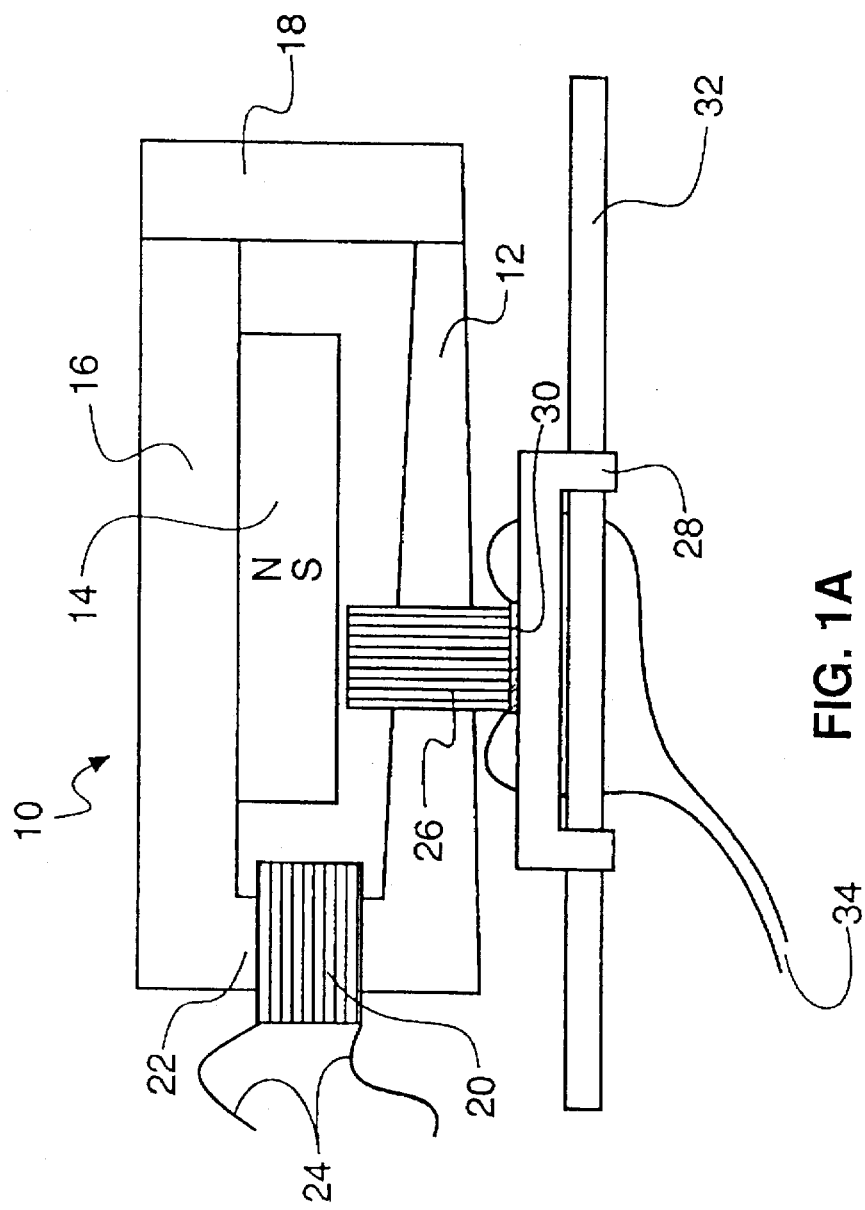
FIG. 1B
FIG. 1A

ELECTROMAGNETIC ACTUATOR WITH MOVABLE COIL AND POSITION SENSOR FOR DRIVE COIL

CROSS-REFERENCE TO RELATED APPLICATION

Reference is made to commonly assigned copending application Ser. No. 08/577,287, entitled Electromagnetic Actuator With Position Sensor and filed in the names of Bryant et al. on Dec. 22, 1995.

FIELD OF THE INVENTION

The invention relates generally to the field of actuators, and in particular to electromagnetic actuators. More specifically, the invention relates to an electromagnetic actuator with a position sensor.

BACKGROUND OF THE INVENTION

In order for an automatic camera to accommodate a range of exposure values, it is necessary for the scene luminance and distance to be measured, and the shutter speed, lens aperture, and focal distance to be rapidly adjusted accordingly just prior to exposing the photographic film or electronic image sensor in the camera. To effect a correct exposure level upon a photosensitive surface, the adjustments to the shutter speed and lens aperture must be done with a certain degree of accuracy which generally entails the use of either fixed stop positions or some sort of position sensing and feedback control of the aperture or shutter elements. This has been done in the past using Hall Effect devices and optical feedback. Such approaches generally involve relatively costly parts or are susceptible to temporal and thermal drift in their output signals or both.

U.S. Pat. No. 5,172,298, which issued in the name of Shimizu et al. on Dec. 15, 1992, discloses an electromagnetic actuator with position sensing capability. The actuator is an example of a moving iron design which employs a soft magnetic core around which is coaxially placed a drive coil as is commonly used in linear solenoid design. Passage of electrical current through the drive coil creates a magnetic field whose flux lines are drawn toward the low reluctance path presented by the core material. The increased potential energy created by this condition is manifested as a force which tends to draw the iron core and attached plunger into the drive coil. This is a unidirectional device and reversal of the current does not create a force in the opposite direction. Consequently, two springs are required in the Shimizu device for providing a restoring force to the plunger assembly.

A detection coil is also placed coaxially with the core. As the core moves axially, the "length of the portion of the core which is located within the detection coil varies, thereby varying the inductance of the detection coil." The variable inductance is used to vary the resonant frequency of an electrical oscillator circuit. A frequency-to-voltage conversion circuit is then used to convert the frequency of the output from the oscillator into a proportional voltage signal which is interpreted as an indication of the position of the core/plunger assembly.

SUMMARY OF THE INVENTION

The present invention is directed to overcoming one or more of the problems set forth above. Briefly summarized, according to one aspect of the present invention, an electromagnetic actuator with position sensor includes a core made of a soft magnetic material, a permanent magnet located adjacent the core for providing a magnetic field in the core and an electrically conductive drive coil wrapped about a first portion of the core. The drive coil is supported such that the drive coil can move along the first portion of the core. An electrically conductive sense coil is wrapped about a second portion of the core and fixed relative to the core such that there is substantially no relative movement between the sense coil and the core. When an electrical current is passed through the drive coil, the drive coil moves along the first portion of the core and an electrical current is induced in the sense coil which indicates the position of the drive coil relative to the first portion of the core.

The invention described herein employs relatively few low cost parts by combining functions, yet provides adequate levels of precision, resolution, speed, and drift immunity in an electromagnetic actuator. These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1A is a side schematic view of an electromagnetic actuator with position sensor;

FIG. 1B is an end view of the electromagnetic actuator as seen from the right side of FIG. 1A;

DETAILED DESCRIPTION OF THE INVENTION

Figure 2:
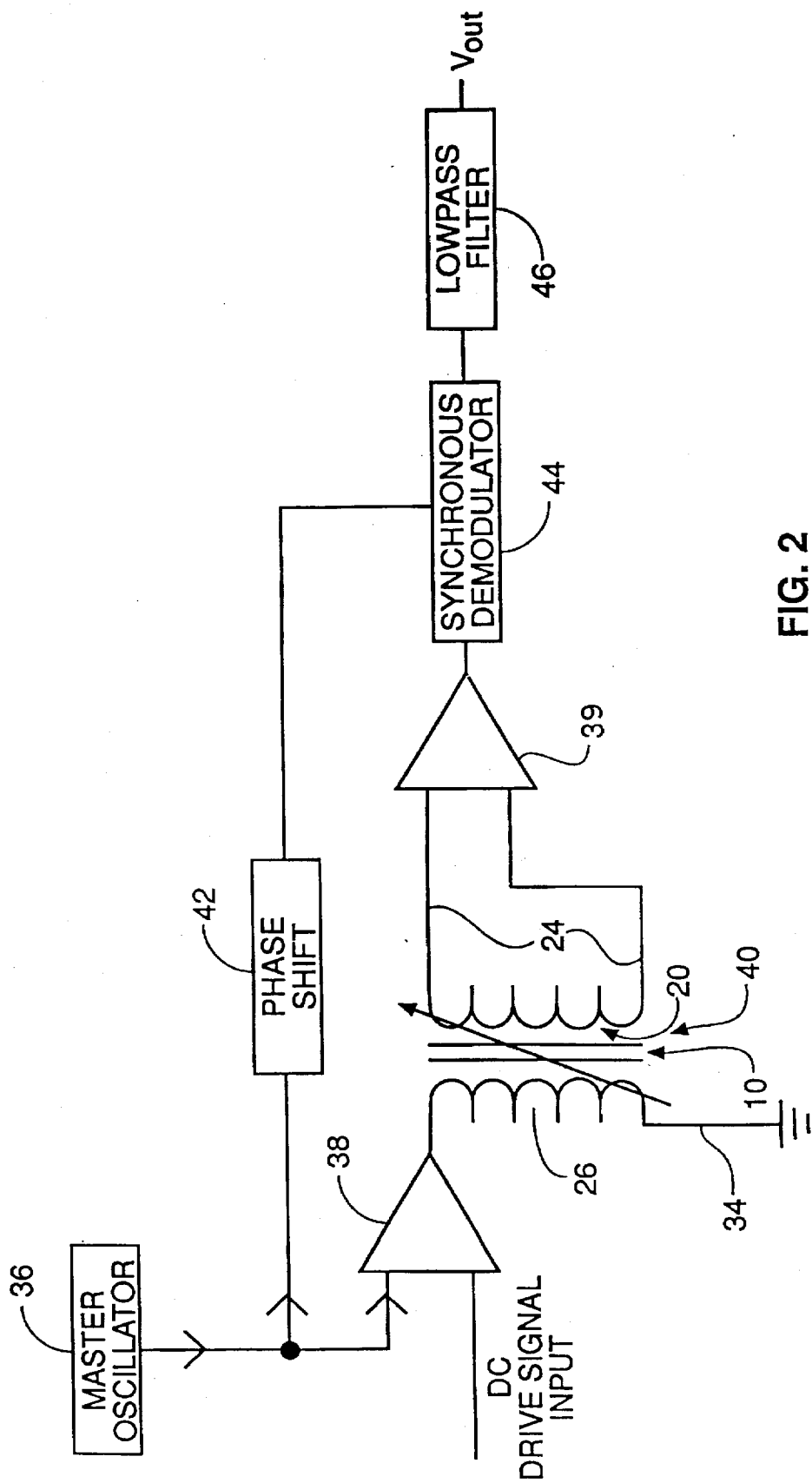
FIG. 2 is a schematic circuit diagram used to derive a voltage proportional to a drive coil position.

Beginning with FIGS. 1A and 1B, a U-shaped core 10, made of a suitable soft magnetic material (e.g. cold rolled or sintered steel), is used to establish a magnetic circuit flux path. Core 10 includes a first leg portion 12 which, in the preferred embodiment, is tapered in cross-section. A permanent magnet 14, secured to a second leg portion 16 of core 10, provides a time invariant magnetic flux through the magnetic circuit (core). The core also includes an end plate 18, also made of a suitable soft magnetic material, which is part of the aforementioned magnetic circuit flux path.

An electrically conductive sense coil 20 is wrapped about a base portion 22 of core 10. Coil 20 is fixed relative to base portion 22, for example by gluing coil 20 to the base portion, such that there can be substantially no relative movement between coil 20 and the base portion. Sense coil 20 can be copper wire covered with electrically insulating plastic. Sense coil 20 acts as a secondary winding of a linear variable transformer. A pair of electrical leads 24 conduct induced electrical current from sense coil 20. During assembly, prior to securing end plate 18 to legs 12, 16, coils 20, 26, which were formed previously, are slid over leg 12 and properly positioned. Then end plate 18 is secured to the ends of legs 12, 16.

A moveable drive coil 26 is wrapped about leg portion 12 of core 10. Coil 26 can also be made of copper wire covered with electrically insulating plastic. Coil 26 is secured to a slider 28 by an adhesive bond 30. Slider 28 is supported for movement by a pair of rods 32 on which the slider slides.

Slider 28 can also be supported for movement by using parallel beam flexural suspensions. The electrical connections to drive coil 26 are accomplished through a flexible wire 34 such as a Litz wire with a slack loop to accommodate the motion of the drive coil, or a flexible interconnect device such as a "flex circuit" material. The implement to be driven, such as a camera shutter or aperture, is connected to slider 28.

Turning to FIG. 2, there is depicted schematically circuitry used to derive a voltage proportional to the drive coil position along leg portion 12 of core 10. A master oscillator circuit 36 provides a stable AC voltage, preferably having a high frequency (e.g. Å 40 KHz), to the input of a summing circuit 38. Summing circuit 38 combines the AC voltage from the master oscillator circuit with a DC voltage from a DC power supply (not shown) into one composite electrical signal to be applied to drive coil 26 via one of leads 34. The other lead 34 is connected to ground. A differential amplifier 39 buffers the voltage which is induced in the sense coil 20. Core 10, drive coil 26 and sense coil 20 function as a linear variable transformer 40. A phase shifting circuit 42 enables synchronous demodulation.

It is recognized that, particularly in high speed actuator applications, the electrical drive signal into drive coil 26 may in fact have harmonic content in the frequency range detectable by the LVT. This potential confounding of the sense signal out of sense coil 20 is minimized through use of synchronous detection of the carrier frequency in the output signal. Accordingly, a synchronous demodulator 44 detects the amount of phase shifted signal at the excitation frequency which has been coupled into the transformer secondary winding (sense coil 20). Finally, a low pass filter 46 for signal conditioning makes $V_{out}$ suitable for use in a closed loop servo which controls the electrical current supplied to drive coil 26. As a result, the position of drive coil 26 along tapered leg 12 can be accurately determined.

Figure 3:
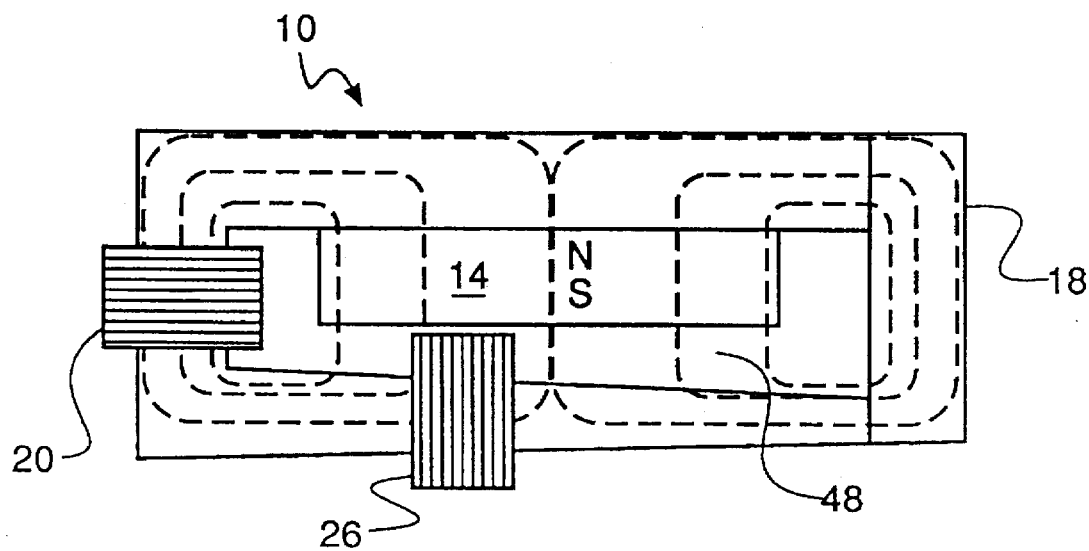
FIGS. 3 and 4 are side schematic views of the electromagnetic actuator showing magnetic flux paths.
Figure 4:
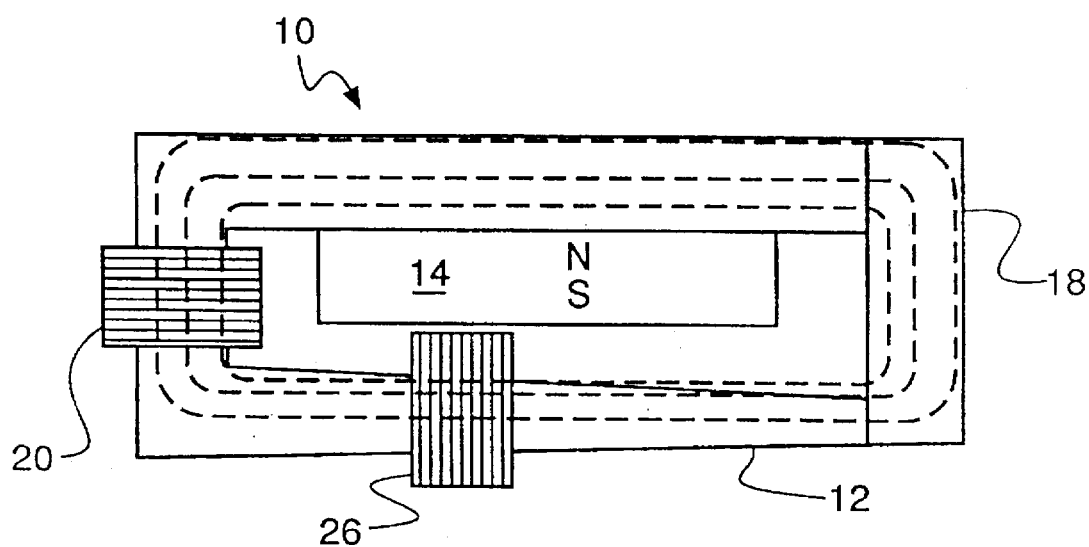

With reference to FIGS. 3 and 4, further description of the electromagnetic actuator will be made. A first magnetic circuit is created by permanent magnet 14, core 10, end plate 18, and an air gap 48 within the core as shown in FIG. 3. A second magnetic circuit is created and superimposed upon the first magnetic circuit by drive coil 26 and sense coil 20, which encircle two legs of core 10 respectively, the core, and end plate 18 as shown in FIG. 4. When an electrical current is passed through drive coil 26, Lorentz forces acting in the direction of the drive coil axis are generated between permanent magnet 14 and coils 20, 26 thus propelling drive coil 26 in one or another direction along tapered leg 12 of core 10. The direction and magnitude of the Lorentz force is dependent upon the direction and magnitude of the current flowing in the drive coil and, consequently, the electromagnetic actuator may be operated bidirectionally, obviating the need for any type of external return means (e.g. a spring).

As described above, sense coil 20 encircles base portion 22 of core 10. A voltage is produced in the sense coil through mutual inductance proportional to the time rate of change of flux carried in the base portion of the core. The efficiency of this mutual inductance is proportional to the amount of core material present within drive coil 26 at any time. Hence, as the drive coil moves to the right in the Figures, a decrease in the amount of iron within drive coil 26 occurs due to the tapered cross section of leg 12, resulting accordingly in a decrease in the magnetic coupling between the drive coil and the core. This decrease in coupling results in less mutual induction between the drive and sense coils. The decrease in mutual induction manifests itself as a decrease in the AC voltage across the sense coil, thereby giving an indication of the position of the drive coil along leg portion 12 of core 10. This principle of operation is recognized to be a linear variable transformer (LVT). As in other transformer applications, the ratio of the number of turns in the drive and sense windings respectively may be optimized for gain and impedance matching considerations.

The mechanical time constant of the electromagnetic actuator is sufficiently long as to appear as a low pass filter to the high frequency AC current and hence, this signal does not cause motion of the drive coil in the actuator.

Figure 5:
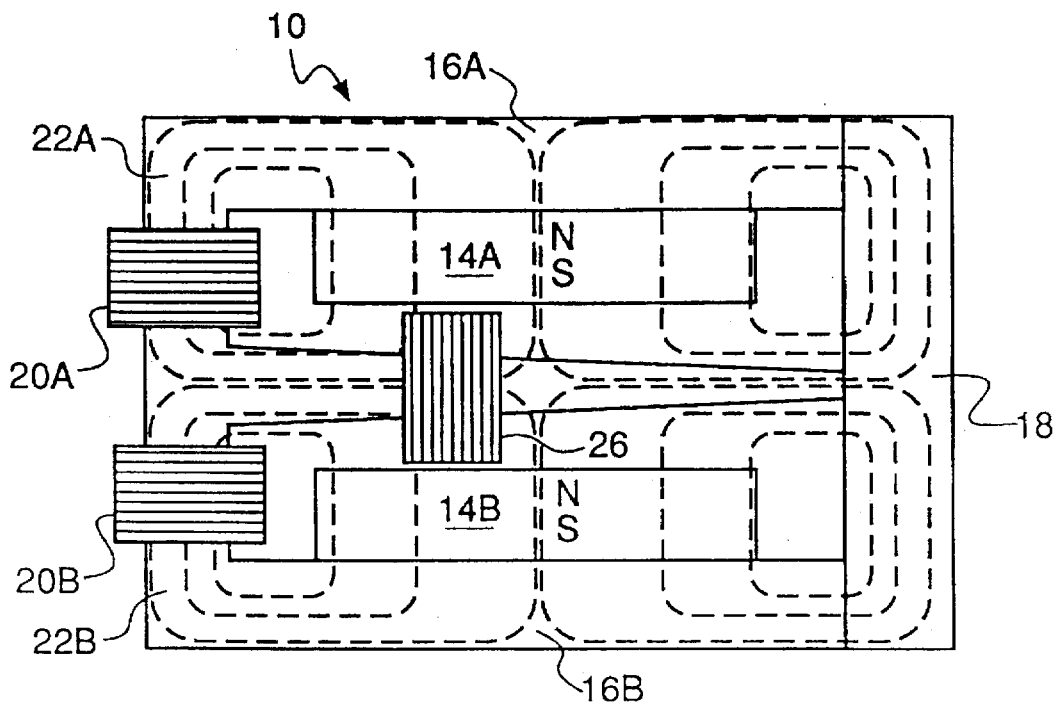
FIGS. 5 and 6 are side schematic views of a second embodiment of the electromagnetic actuator.
Figure 6:
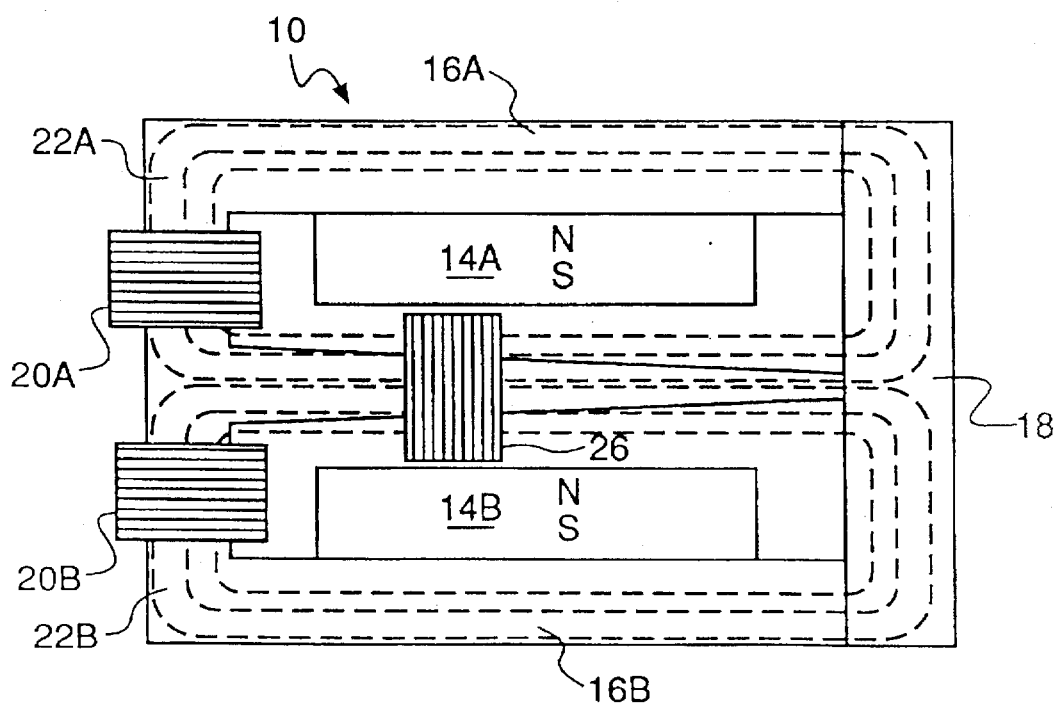

A second embodiment of the invention, incorporating the same operating principles as found in the first embodiment, is shown in FIGS. 5 and 6. This embodiment incorporates a pair of permanent magnets 14A, 14B, a pair of sense coils 20A, 20B, an extended end plate 18, a second base portion 22B of core 10, and a second leg portion 16 B. The circuit of FIG. 2 is modified for the second embodiment to include a second differential amplifier for the additional sense coil. The outputs of the two differential amplifiers are then fed into a summing circuit, the output of which is fed into a synchronous demodulator. The effect on performance is to essentially double the Lorentz forces acting upon the drive coil and is suitable for applications where higher forces and accelerations are required but where space considerations are not of paramount importance.

The present invention offers numerous advantages over the prior art, including (a) relatively few parts (e.g. no return springs necessary, fewer parts in the electronic circuitry), (b) higher linearity of operation due to use of a constant frequency oscillator and (c) thermal variations are easily compensated for by passive compensation components (e.g. resistor or coil in the feedback loop function well because of inherent linearity of the system).

The invention has been described with reference to a preferred embodiment. However, it will be appreciated that variations and modifications can be effected by a person of ordinary skill in the art without departing from the scope of the invention.

We claim:

1. An electromagnetic actuator with position sensor, comprising:
   a core made of a soft magnetic material;
   a permanent magnet located adjacent and fixed relative to a first portion of the core for providing a magnetic field in the core;
   an electrically conductive drive coil wrapped about a second portion of the core, the second portion having a cross-section which changes along a length of the second portion;
   means for supporting the drive coil such that the drive coil can move along the second portion of the core; and
   an electrically conductive sense coil wrapped about a third portion of the core and fixed relative to the core such that there is substantially no relative movement between the sense coil and the core,
   such that when an electrical current is passed through the drive coil, the drive coil moves along the second portion of the core and an electrical current is induced in the sense coil which indicates the position of the drive coil relative to the second portion of the core.

2. The actuator of claim 1, wherein the second portion of the core is tapered in cross-section.

3. The actuator of claim 1, further comprising:
   a second permanent magnet located adjacent a fourth portion of the core for providing a magnetic field in the core; and a second electrically conductive sense coil wrapped about a fifth portion of the core and fixed relative to the core such that there is substantially no relative movement between the second coil and the core, such that when an electrical current is passed through the drive coil, the drive coil moves along the second portion of the core and an electrical current is induced in the two sense coils which indicates the position of the drive coil relative to the second portion of the core.

4. The actuator of claim 1, wherein said supporting means includes a slider attached to the drive coil and a pair of guide rods which engage the slider and enable the slider to move along the guide rods.

5. The actuator of claim 1, further comprising:

a source of a composite electrical signal having a first AC component added to a DC component, the source being electrically connected to the drive coil to cause the drive coil to move; and a demodulator for detecting phase shift between the first AC component and a second AC component induced in the sense coil, the demodulator being electrically connected to the sense coil, whereby an output from the demodulator is proportional to the position of the drive coil relative to the second portion of the core.

* * * * *